W. D. McDONALD.
Milk-Coolers.
No. 137,557. Patented April 8, 1873.
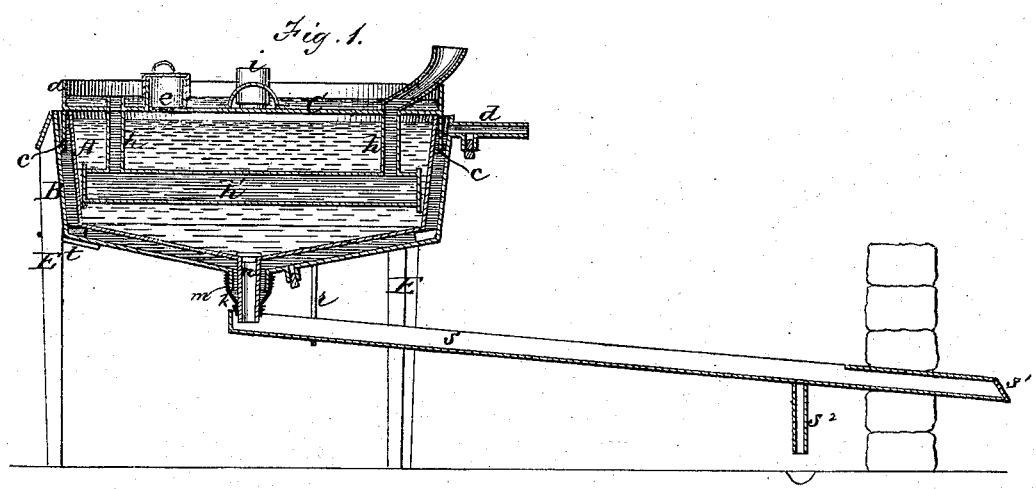
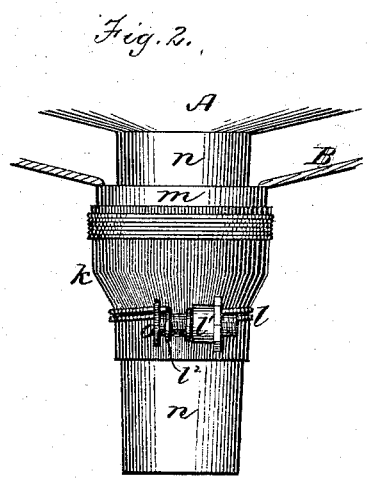
Witnesses
Inventor
W. D. McDonald
by Geo. E. Brown.
Atty.

UNITED STATES PATENT OFFICE.

WILLIAM D. McDONALD, OF RANDOLPH, NEW YORK.

IMPROVEMENT IN MILK-COOLERS.

Specification forming part of Letters Patent No. 137,557, dated April 8, 1873; application filed September 2, 1872.

*To all whom it may concern:*

Be it known that I, WILLIAM D. McDONALD, of Randolph, Cattaraugus county, in the State of New York, have invented a certain Improvement in Milk-Coolers, of which the following is a specification:

This invention has for its object both to extract the animal heat from milk before setting it for cream to rise, and also to preserve it at the temperature reached by such extraction of heat. The invention relates principally to the combination, with an inner milk-vessel and an inclosing water-vessel, of a cover for the inner vessel, having a double flange at its rim, one flange extending upward and the other downward into the space between the two vessels, so that when this space is filled with water the said flange enters it, and the water, therefore, completely seals the inner pan, the upper flange also serving to hold water and operate as a cooler.

Figure 1 is a longitudinal vertical section, and Fig. 2 is a detached elevation of the discharge-tubes and connecting-hose.

A is the inner vessel, B the outer vessel, and C the cover aforesaid, the same being of greater diameter than the vessel A, and of less diameter than the vessel B, and having the double flange $a$ $c$, the one extending upward and the other downward, and the latter being wide enough to reach below the mouth of the discharge-pipe $d$—in other words, below the surface of the water in the vessel B—causes the water to seal the inner pan. The cover C has a strainer, $e$, fitted to it through which to strain milk into the pan A, said strainer being in a tube which extends above the top of the flange $a$, so that the milk may be strained while water is on the cover C, and thus cooled to some extent before entering the pan. A flow of cold water is maintained continually upon the cover, and this water runs over the top of the flange $a$, or through a hole in the same, into the outer vessel, thus keeping the cover cool and condensing the warm air inside. Two pipes, $h$, extend downward from the cover, opening through the same at their tops, and connected at their lower ends by a cross-pipe, $h'$. Cold water entering one of the pipes $h$, and passing thence through $h'$, aids in cooling the milk which surrounds the pipes $h$ $h'$. Tubes $i$ opening through the cover C ventilate the pan A. By the complete exclusion of the external air by means of the flange $c$, by the holding of cold water above the milk-pan by means of the flange $a$, and by the introduction of cold water into the pan A by means of the pipes $h$ $h'$, the animal heat of the milk is quickly abstracted. The milk is kept at the resulting temperature by the flow of continuous currents of cold water. The pan B is provided with a discharge-tube, $m$, at its bottom, through which it may be entirely emptied. The pan A is also provided with a similar discharge-tube, $n$, passing clear through the tube $m$. A piece of hose, $k$, is wired tightly upon the outside of the lower end of tube $m$, and a wire, $l$, passed around the lower end of the hose, the contiguous ends of which wire are attached, one to a nut, $l^1$, and the other to a loop, $l^2$, that incloses a screw, $o$, passing through a nut, $o'$. By turning this screw in one direction the hose is bound upon the tube $n$, making a water-tight joint.

To let the water out of the vessel B, it is only necessary to loosen the wire $l$ by turning the screw $o$ backward, which releases the hose $k$ from the tube $n$.

To the bottom of the outer pan is attached a folding loop, $r$, which sustains the end of a trough, $s$, which passes through the wall of the dairy-house, and has a flap, $s^1$, at its outer end. The trough $s$ is immediately under the pipe $d$, the waste-water from which it conducts away and voids through the tube $s^2$. The trough $s$ is also immediately beneath the end of the tube $n$, and receives the sour milk when it is let out therefrom. When this is done the tube $s^2$ is plugged, and the milk caused to flow through the wall and escape at the end of the trough, raising the flap $s^1$, which falls when the milk has passed, thus excluding insects and odors from the drain. The sockets $t$ for the legs E project through the bottom of the pan B, and form rests for the pan A.

I claim as my invention—

1. In combination with an inner and an outer pan, a cover having a flange, as described, so as to seal the inner pan in connection with water in the outer.

2. A cover having water-pipes depending from it within the milk-pan, so as to cool the contents of the latter, as specified.

3. In combination with the vessels A and B, the trough $s$ having the tube $s^2$ and flap $s^1$, as explained.

WILLIAM D. McDONALD.

Witnesses:
H. C. RICH,
C. C. RICH.